UNITED STATES PATENT OFFICE.

LIVERAS HULL, OF CHARLESTOWN, ASSIGNOR TO HIMSELF AND A. WHEELER, OF BOSTON, MASSACHUSETTS.

IMPROVED METHOD OF MAKING COPAL VARNISH.

Specification forming part of Letters Patent No. 26,232, dated November 22, 1859.

*To all whom it may concern:*

Be it known that I, LIVERAS HULL, of Charlestown, in the county of Middlesex and State of Massachusetts, have invented or discovered a new and useful Composition or Varnish; and I do hereby declare that the same is fully described in the following specification.

The object I have had in view in the discovery or invention of this composition has been to obtain a substantial and cheap varnish, which might serve as a substitute for the costly oil-varnishes I had been obliged to employ in the prosecution of my business. For a long time past I have been experimenting with certain kinds of copal to find some solvent which would readily dissolve the resins, and not only render them practicable, but economical as a varnish. I have tried alcohol, oil of turpentine, naphtha, and many other oils, but without effect. None of which alone will dissolve the resin; but I have discovered that by a mixture of about four parts of alcohol to one of oil of turpentine the copal is dissolved in a very short space of time. It is a fact well known to varnish-makers that there are several kinds of copal, some of which when prepared in oil it is almost, if not entirely, impossible to cause to dry, they always retaining a gummy, sticky consistency. Owing to this fact several kinds of copal have become a drug in the market. These have received my especial attention, my purpose being to utilize them; and by treating them in my improved manner I have been able to produce from them as good, if not a better, varnish than can be made from the best species of copal when prepared in oil, &c.

I am aware that copal varnish has been made of copal, linseed-oil, and oil of turpentine, in which case each of the three substances were put into a separate vessel, the copal fused or melted, and the oil heated to a temperature a little under its boiling-point. The oil was then added in small portions to the melted copal and well stirred. After the temperature of the mixture had somewhat lessened the oil of turpentine was poured into the mixture of copal and oil and incorporated therewith. After being suffered to cool the compound or varnish was strained through a filter to separate the impurities and undissolved copal. This varnish, as well as its mode of manufacture, differs very essentially from mine.

In the manufacture of all copal varnishes with which I have become acquainted linseed or some other clarified oil has been one of the principal ingredients. In making my composition or varnish I make no use of any such oil or its equivalent.

In making thirty gallons of the varnish I take forty-eight pounds of copal, four gallons of camphene, and twenty gallons of alcohol at ninety-five per cent., or their equivalents. These I put in a cold state into a barrel or other suitable vessel, and then close up the same, so as to render the vessel air-tight. The vessel is then suffered to remain for thirty-six hours, and occasionally in the meantime agitated or rolled around, so as to mix up the ingredients and incorporate them together. The varnish is then ready for use.

My varnish possesses the merit of great economy, (its cost not being one-half as much as that of the common copal varnish prepared in the usual manner;) and while its durability is equal to that of the best oil-varnish, it becomes dry or indurated in a very short time after its application.

Another great advantage my varnish has over the oil-varnishes is the great ease with which it is applied, three coats of it being applied and dried in the same time it would require one of the oil-varnish to become indurated, making a saving of at least thirty-three per cent. in time and labor.

I lay no claim to the employment of either camphene (rectified spirits of turpentine) or alcohol in connection with gum-copal for the purpose of making varnish, as both camphene and alcohol have been separately used; nor do I claim the employment of oil of turpentine and spirits of wine in connection with mastic and resin in order to form a varnish; but What I do claim is—

My new manufacture of varnish as composed of gum-copal, camphene, and alcohol united in the proportions, in a cool state, in a closed or air-tight vessel, substantially as specified.

LIVERAS HULL.

Witnesses:
F. P. HALE, Jr.,
ARTHUR NEILL.